United States Patent Office 3,350,290
Patented Oct. 31, 1967

3,350,290
PHOTOCHEMICAL PRODUCTION OF
CYCLOPROPANE
Donald P. Gush, Hyattsville, and Nelson S. Marans, Silver Spring, Md., assignors to W. R. Grace & Co., New York, N.Y., a corporation of Connecticut
No Drawing. Filed Mar. 14, 1966, Ser. No. 533,809
1 Claim. (Cl. 204—162)

ABSTRACT OF THE DISCLOSURE

This invention is directed to a process for preparing cyclopropane by subjecting a mixture of methane and ethylene to ultraviolet radiation having a wave length of from 1000-1850 A. and recovering the thus formed cylopropane.

---

The present invention relates to the production of cyclopropane, and more specifically to a novel method for producing cyclopropane directly from inexpensive and readily available raw materials.

Cyclopropane (trimethylene) which possesses value as an inhalation anesthetic, has heretofore been produced by numerous classical organic synthesis techniques. For example, cyclopropane has been produced by reacting 1,3, dihalopropane with zinc in the presence of sodium iodide or alcohol, or with sodium vapor. Still another method comprises reacting ethylene with methyl iodide and a zinc-copper couple.

These prior art techniques, while providing cyclopropane, possess inherent drawbacks in that they utilize relatively expensive intermediate compounds.

It is therefore an object of the present invention to provide a novel method for producing cyclopropane.

It is another object to provide a cyclopropane synthesis which utilizes inherently cheap raw materials.

These and still further objects of the present invention will become apparent to one skilled in the art from the following detailed description and specific examples.

Broadly, our present invention comprises radiating methane-ethylene gas mixtures with ultraviolet light at pressures below about one hundred atmospheres to obtain photolysis thereof, and recovering cyclopropane from the photolysis reaction mixture.

More specifically, we have found that cyclopropane may be directly produced from methane and ethylene by subjecting a gaseous mixture of methane and ethylene comprising from about 0.2 to about 10 moles of methane per mole of ethylene to the photolytic action of ultraviolet light having a wave length range of from about 1000 to about 1850 A. units. During the resultant photolysis reaction cyclopropane is produced and may be recovered from the reaction mixture using conventional separation techniques.

The methane and ethylene used in the practice of the present invention may be of conventional commercial grade that may possess small amounts of impurities such as hydrogen and hydrocarbon compounds. However, it is generally preferred that the initial reaction mixture be substantially dry and possess a minimum number of impurities which would tend to uneconomically absorb the UV irradiation used to initiate the reaction. As indicated above, the mole ratio of methane to ethylene used in the present reaction mixtures ranges from about 0.2 to about 10 moles of methane per mole of ethylene. Ratios of methane to ethylene outside this range may be utilized in that some of the desired product will be obtained. However, it is generally found that more desirable yields are obtained when mole ratios in the above range are utilized.

During the course of the photolysis reaction, a pressure of from about 100 atmospheres down to about 25 mm. may be used. However, higher pressures (above one atmosphere) are preferred since the yield of cyclopropane is found to increase with pressure. Apparatus utilized to conduct the present reaction comprises a source of UV light having the desired wave length, coupled to a reaction chamber which is used to contain the reactants. Such apparatus is generally described in the prior art and has heretofore been used in the study of various photolytic reactions at various pressures.

The UV light or radiation used in the practice of the present invention possesses a wave length of from about 1000 to about 1850 A. units. This UV irradiation may be produced by any conventional UV lamp which produces a substantial proportion of light falling within this desired wave length. Typically, a light source, which comprises a krypton resonance lamp and a transparent lithium fluoride window and which produces a large amount of principal radiation of 1236 A. is found to be particularly suitable for the practice of this invention.

In general the present photolysis reaction takes place within a period of from about 3 to about 300 minutes, depending on the energy output of the apparatus used. It is also contemplated that time periods ranging as low as one second up to about 10 hours may be utilized in the practice of the present invention. Generally, it is found that the most economical use of the UV light occurs when the energy absorbed by the system amounts to about 0.2 to 20 kilowatt hours per mole of methane.

Subsequent to the photolysis reaction, the reaction mixture is subjected to any conventional separation procedure whereby cyclopropane may be covered. Typically, the reaction mixture may be subjected to a careful fractional distillation, or when the amount of sample is relatively small, a conventional gas chromatographic technique may be utilized.

Having described the basic aspects of the present invention, the following examples are given to illustrate embodiments thereof.

EXAMPLES

In the examples tabulated below, various ratios of methane to ethylene were admitted to a previously evacuated reaction cell. This mixture was then irradiated with a krypton resonance lamp having a principal radiation of 1236 A. units. The lamp consisted of a Pyrex tube filled with krypton to approximately one mm. Hg pressure and a lithium fluoride window attached to one end which permitted the transmission of the light into the reaction cell. The samples were irradiated for various lengths of time and samples of the gas were removed from the cell and subjected to a gas chromatographic analysis.

The chromatographic apparatus utilized hydrogen flame ionization detection and comprised columns of two different types. One was a 30 ft. ¼ in. O.D. column which was filled with 30% Squalane upon Chromosorb P (60–80 mesh). The other column comprised a 20 ft. ¼ in O.D. tube, the first 10 ft. containing 20% di(2-ethylhexyl)sebacate, the second 10 ft. containing 20% bis(2-methoxyethyl)adipate with both esters being absorbed on Chromosorb P. The columns were operated at 50° C. using a nitrogen carrier gas flow rate of 30 cc. per minute. All the irradiation reactions indicated below, were conducted at a temperature of 25° C. The results of numerous runs are tabulated below:

TABLE I.—FORMATION OF CYCLOPROPANE BY IRRADIATION OF METHANE ETHYLENE MIXTURES WITH VACUUM ULTRVIOLET LIGHT

| Example No. | Gas Pressures (mm. of Hg) | | Cyclopropane Peak Hgt.[a] | Approximate Sample Size [b] |
|---|---|---|---|---|
| | $CH_4$ | $C_2H_4$ | | |
| 1 | 1 | 3 | 0.5 | 1/2 |
| 2 | 20 | 20 | 5.0 | 1/10 |
| 3 | 200 | 200 | 1.0 | 1/200 |
| 4 | 200 | 200 | 6.5 | 1/10 |
| 5 | 122 | 20 | 10.0 | 1/10 |
| 6 | 20 | 20 | 1.5 | 1/10 |
| 7 | 20 | 20 | 1.0 | 1/10 |
| 8 | 20 | 20 | 2.5 | 1/10 |
| 9 | 150 | 150 | 2.0 | 1/200 |
| 10 | 150 | 150 | 90.0 | 1/5 |
| 11 | 100 | 100 | 1.0 | 1/200 |
| 12 | 100 | 100 | 3.0 | 1/200 |
| 13 | 100 | 100 | 84.0 | 1/5 |
| 14 | 50 | 50 | 0.5 | 1/200 |
| 15 | 50 | 50 | 24.0 | 1/10 |
| 16[c] | 50 | 50 | 2.0 | 1/10 |
| 17[c] | 50 | 50 | 1.5 | 1/10 |

[a] Arbitrary units as obtained from chart paper.
[b] Given as fraction of total gases that was analyzed.
[c] These runs were 5 minute photolyses, all others were 30 minutes.

The above examples clearly indicate that substantial yields of cyclopropane may be prepared using the presently disclosed technique.

We claim:

A method for preparaing cyclopropane said method comprising;
  (a) preparing a mixture of a methane and ethylene, the mole ratio of methane to ethylene in said first mixture being about 0.2–10:1;
  (b) subjecting said mixture to ultraviolet radiation, said radiation having a wave length of about 1000–1850 A. while maintaining said mixture at a pressure of less than 100 atmospheres and at a temperature of —80 to +250° C. for about 3–300 minutes in an apparatus having a source of ultraviolet radiation and a reaction chamber, the power absorption per mole of methane being 0.2–20 kilowatt hours; and
  (c) recovering the thus formed cyclopropane.

References Cited
UNITED STATES PATENTS
2,762,768   9/1956   Cier _____ 204—162

HOWARD S. WILLIAMS, *Primary Examiner.*